Feb. 18, 1936. J. N. STERN ET AL 2,031,286
PLANET WHEEL GEARING
Filed April 16, 1935 2 Sheets-Sheet 1
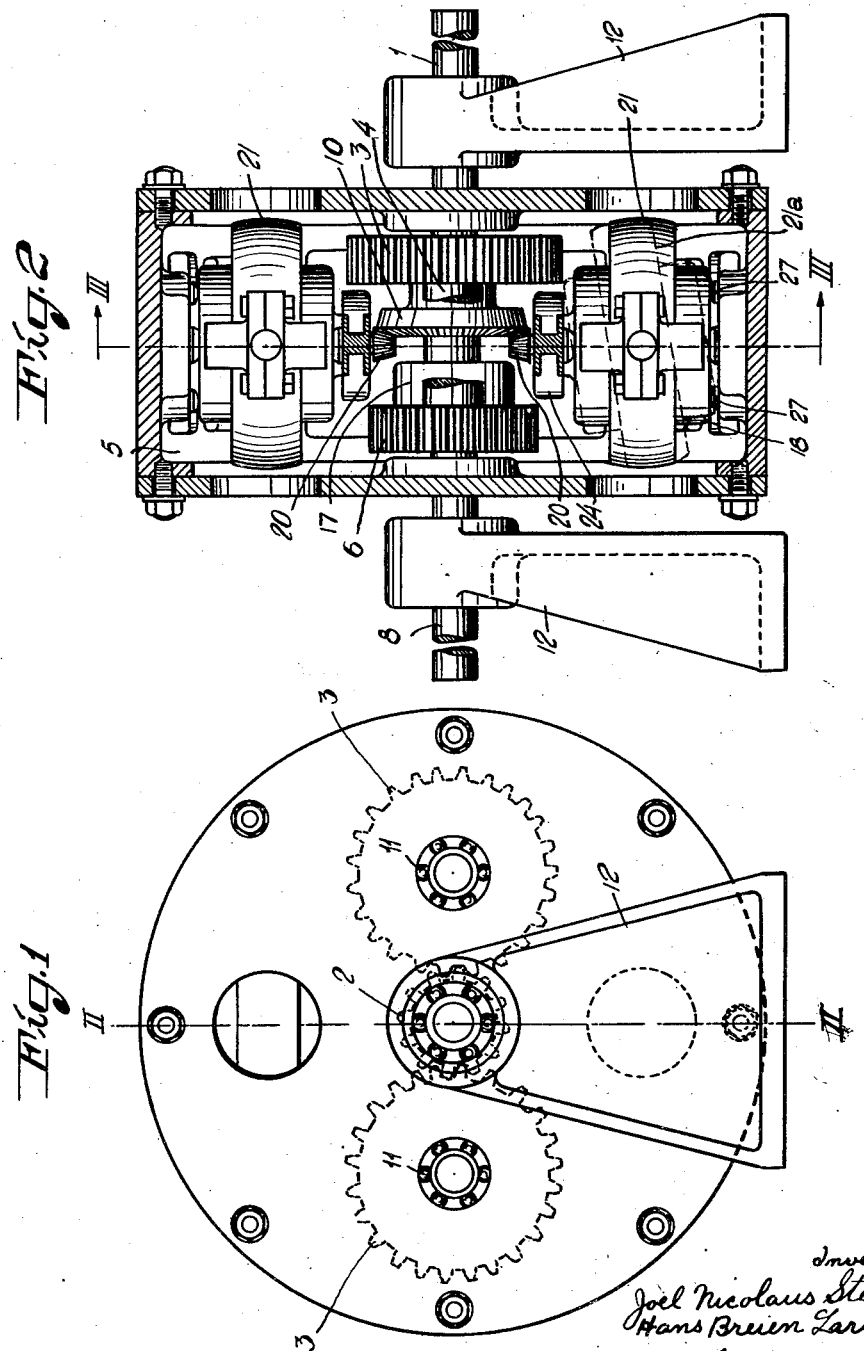

Feb. 18, 1936.  J. N. STERN ET AL  2,031,286
PLANET WHEEL GEARING
Filed April 16, 1935   2 Sheets-Sheet 2
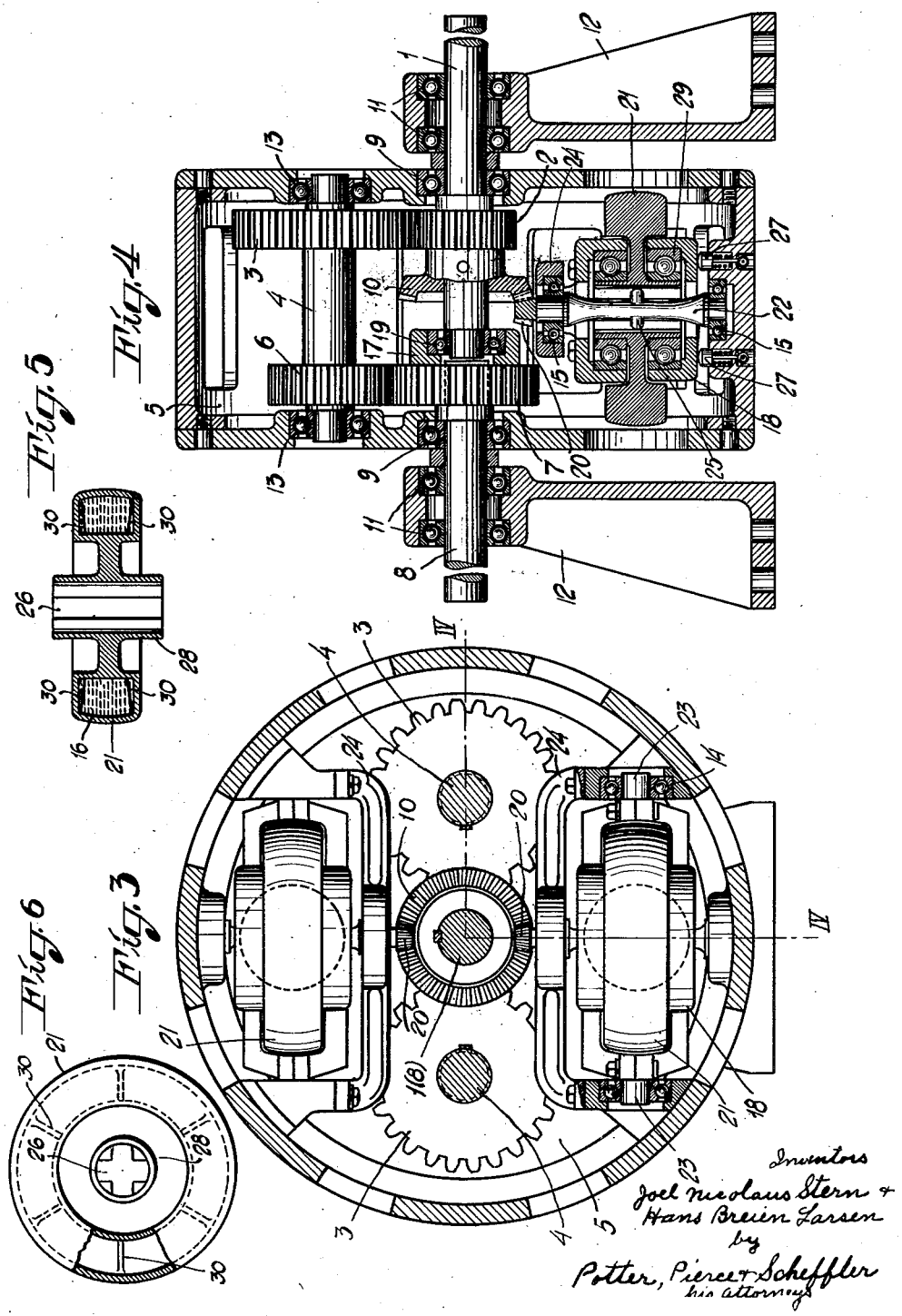

UNITED STATES PATENT OFFICE 2,031,286

PLANET WHEEL GEARING

Joel Nicolaus Stern, Alsten, and Hans Breien Larsen, Amal, Sweden

Application April 16, 1935, Serial No. 16,708
In Sweden February 23, 1933

15 Claims. (Cl. 74—259)

The present invention relates to a planet wheel gearing, particularly for power driven vehicles, in which the planet wheel carrier is rotatable per se about the co-axial shafts of a driving and a driven sun wheel, and carries one or more gyroscopes driven in dependence on its rotary movement relatively to the shafts of the sun wheels, the axes of rotation of said gyroscopes being arranged at an angle to the sun wheel shafts.

In a known planet wheel gearing of this type, in which the sun wheels and the planet wheels are constituted by bevel gear wheels, the gyroscopes are rigidly connected directly to the planet wheels, the axes of rotation of which are radially arranged and stationary with respect to the planet wheel carrier. Through the autorotation of the gyroscopes together with the planet wheels, a damping force is produced at the planet wheel carrier for the purpose of adapting the ratio of gear to the load on the driven shaft, which force counteracts the rotary movement of the planet wheel carrier, and which will be the greater the faster the gyroscopes rotate about their own axes. As a matter of fact, however, this effect cannot be obtained in the desired degree. The gyroscopes in their capacity as inertia masses can only exert small forces on the planet wheel carrier or on the other parts of the gearing according to the inertia of the mass counteracting the acceleration or retardation of said masses. Thus an automatic adaptation of the gearing to the load on the driven shaft in every instance will not be possible. Besides, the gyroscopes in addition to their rotatability about their own axes and about the axis of the planet wheel carrier must have a third degree of freedom, in order that the gyroscopes may precess. This third degree of freedom, however, cannot be realized on the basis of the known planet wheel gearing. Besides, when the planet wheels are used to drive the gyroscopes directly, it will be difficult to attain the necessary high rotational speeds of the gyroscopes.

Utilization of the gyro effect also has been proposed for planet wheel gearings of the type where the planet wheel carrier is rigidly connected with the driving shaft, and where the planet wheels cooperate with a single sun wheel arranged on the driven shaft. In one construction of this type of gearing, the driving shaft, for instance, is provided with radial arms connected each at their ends to a separate gyroscope by a ball and socket-like joint, so that each gyroscope will be swingable about its own axis as well as in all directions, within certain limits, relatively to the appertaining supporting arms. Rigidly connected to each gyroscope is a bevel gear meshing with a bevel sun wheel on the driven shaft. The teeth of the bevel gears must be worked in such manner as to permit the limited swingable movements of the gyroscopes without causing mutual jamming. This arrangement aims at a direct impulse-like operation of the central bevel wheel of the driven shaft through the movements of precession of the gyroscopes caused by continuous alterations of the direction of the axes of the gyroscopes at the rotation of the driving shaft. This effect, however, is not obtainable in a sufficient degree on account of the direct locking of the gyroscopes against lateral tilting caused by the friction of the teeth; on the contrary, the gyroscopes will tend to adjust themselves into a constant position of the axes relatively to the radial arms of the driving shaft, so that no appreciable transmission of power can take place from the planet wheels to the sun wheel on the driven shaft.

In a further construction of the same type of gearing, a single conical planet wheel is arranged in the planet wheel carrier connected with the driving shaft, which planet wheel serves to operate a spherical gyroscope arranged centrally within the planet wheel carrier and suspended by a universal joint therein. In this gearing, power transmission from the driving onto the driven shaft can take place only when the rotation of the planet wheel with respect to the planet wheel carrier is braked. This braking effect cannot set in, however, as by reason of its universal suspension the spherical gyroscope cannot exert any inertia effects on the planet wheel carrying the same. The gyro effect at any rate will be perceptible only in so far as the rotary movement of the planet wheel carrier and thus of the driving shaft is braked up. Also the imrovements which have likewise been proposed to the effect that the central gyroscope be given a positive own rotation in dependence on a second planet wheel, about an axis which is stationary relatively to the first planet wheel, will make no difference in this respect. Here, the gyroscope performs three different rotary movements at the same time, but still it cannot bring about the braking effect required for the power transmission, inasmuch as it has no third degree of freedom relatively to the planet gears. Disregarding this fact, the construction of this gearing is a very complicated one.

Considering the type of gearing described in the first paragraph of this specification, each gyroscope according to the invention in addition to its rotatability about its own axis and the axis of rotation of the planet gear carrier is adapted to be turned within certain limits with respect to the planet gear carrier about an axis extending at an angle to the two first-mentioned axes, the gyroscopes being then driven from one of the sun wheel shafts by means of an intermediate gearing separate from the planet wheel carrier. In this way only will a sufficient inertia effect of the gyroscope be obtained, which solely occurs at the planet wheel carrier rotatable per se, and which may in its entirety be utilized in supporting the power transmission. The most advantageous effect will be obtained, when the additional axis of rotation of the gyroscope is arranged tangentially to the circular path described by the centre of gravity of the gyroscope. With respect to its characteristics the novel gearing is comparable to the ship gyroscope according to Schlick. In the novel gearing, the influence of the gyroscope on the planet wheel carrier corresponds to the damping effect of the gyroscope on the rolling ship.

The employment according to the invention of an intermediate gearing separate from the planet gear carriers for the operation of each individual gyroscope involves the very considerable advantage that the operation of the gyroscopes may take place at any speed ratio of gear without regard to the dimensioning of the sun wheels and of the planet wheels. This is of importance for the reason that the rotational speed of the gyroscope must be very high to bring about a sufficient braking effect on the planet gear carrier with a constructively possible dimensioning of the gyroscope.

It has been found suitable to arrange resilient abutments on the planet wheel carrier to limit the additional turning movements of the gyroscopes. This arrangement answers the conditions that the movements of precession necessary to produce a gyro effect shall be permitted to take place, and that the deflections of the gyroscope must not be too great, in order that the damping gyro effect shall react quickly enough on alterations in the speed of the planet wheel carrier.

A constructional embodiment of the invention is illustrated diagrammatically on the accompanying drawings.

Fig. 1 is an endwise view of the planet wheel gearing.

Fig. 2 is a longitudinal section on line II—II in Fig. 1.

Fig. 3 is a transversal section on line III—III in Fig. 2.

Fig. 4 is a longitudinal section on line IV—IV in Fig. 3.

Figs. 5 and 6 show a modification of a detail.

The shafts 1 and 8 extending in alignment with each other, 1 being the driving and 8 the driven shaft, have each a sun wheel 2 and 7 respectively arranged thereon. Besides, the drum-like planet wheel carrier 5 is loosely mounted by means of the anti-frictional bearings 9 on the two shafts 1 and 8 which in turn by the anti-frictional bearings 11 are mounted in the supports 12. The sun wheel is provided with a hub 17, having an anti-frictional bearing 19 for the inner end of the driving shaft 1. Meshing with the sun wheels 2 and 7 is a planet wheel 3 and 6 respectively, or a number of such planet wheels. The planet wheels are arranged in pairs 3, 6 on a common shaft 4 which is rotatably mounted in the planet wheel carrier 5 through the anti-frictional bearings 13.

On the driving shaft 1 is arranged a bevel gear 10 adapted to drive one or more considerably smaller bevel gears 20 arranged on the shafts 22 of gyroscopes 21 journalled radially in the planet wheel carrier 5 by means of the anti-frictional bearings 15 in the supports 24 which are arranged on the inner circumferential wall of the drum-like planet wheel carrier 5, so that the gyroscopes are caused to rotate at a high rate of speed in dependence on the mutual rotary movement of the planet wheel carrier 5 and the driving shaft 1. Said supports may also be arranged on the outside of the planet wheel carrier.

Each gyroscope 21 is held by a frame or bracket 18 supporting the gyroscope on the opposite sides thereof. This frame or bracket 18 is pivotally mounted in the said supports 24 by means of two coaxial journals 23 mounted in antifrictional bearings 14 on both sides of the gyroscope. Thus the gyroscope is rotatable in the planet wheel carrier not only about the axis of the driving shaft 22 thereof, but also, as shown with dotted lines 21a in Fig. 2, about a transverse axis extending preferably through the centre of gravity of the gyroscope. The shaft 22 of the gyroscope is provided with lateral projections 25, which engages longitudinal slots 26 in the hub 28 of the gyroscope. Hereby the gyroscope together with the frame 18 can turn about the said transverse axis, that is to say the axis of the journals 23 independently of the shaft 22. Between the hub 28 of the gyroscope and the frame 18 there are inserted anti-frictional bearings 29. This rotatability of the gyroscope about a transverse axis provides for the so-called third degree of freedom. The first and the second degrees of freedom consist in the rotatability of the gyroscope about the axis of its driving shaft and about the axis of the sun wheel shaft.

The rotatability of the gyroscope about a transverse axis, which forms the third degree of freedom, is preferably limited by resilient or spring-actuated abutments 27 arranged on the inner circumferential surface of the planet wheel carrier 5. The provision of the third degree of freedom is an indispensable condition for a stabilizing effect of the gyroscope, that is to say, is an indispensable condition for the production of a moment of resistance at the planet wheel carrier, which moment at a varying load on the driven shaft will always adjust the ratio of gear of the planet wheel gearing automatically in such a manner that the moment and the number of revolutions of the driving shaft remain constant.

As shown in Figs. 5 and 6 the gyroscopes 21 may be formed as hollow bodies, and may be filled with mercury 16. The space or chamber for the mercury extends along the whole circumference of the gyroscope. Through its inertia the mercury then continues to rotate at the rate of rotational speed imparted to the same when the gyroscopes, that is to say the rigid casings thereof, are subjected to an increase or a decrease of their rotational speeds on any load variations occurring.

Thus a very soft and quick adjustment of the gyroscopes will be obtained, corresponding to the load variations, without the gyro effect being interfered with at the moment of a change of load.

the substantial carrier of the gyro effect being now the body of mercury. The intermediate gearing driving the gyroscopes will in this arrangement be unloaded at the very moment the load changes, and will consequently be subjected to very small stresses only.

By shaping the hollow space of the gyroscopes in a suitable manner (for instance the lateral walls of the space may be provided with radial ribs 30, as shown in Figs. 5 and 6) it will be possible to choose a more rigid or looser coupling effect between the gyro casing and the mercury; this coupling effect must not be too loose to permit of quick starting.

The filling of the gyroscopes with mercury involves the further advantage that the dimensions of the gearing may be considerably reduced.

What we claim is:—

1. A planet wheel gearing comprising coaxial driving and driven shafts each carrying a sun wheel, planet wheel means for transmitting motion between said sun wheels and including a planet wheel carrier rotatable about the axis of said shafts, a gyroscope carried by said planet wheel carrier with the axis thereof at an angle to said shafts, said gyroscope being adapted to be rotated in accordance with the motion of said shafts, means actuated by one of said shafts and independent of said planet wheel means for rotating said gyroscope about its axis, means supporting said gyroscope for rotation about its axis, and means supporting said gyroscope for limited angular movement about a transverse axis arranged at an angle to the axes of the gyroscope and of said shafts.

2. A planet wheel gearing comprising coaxial driving and driven shafts each carrying a sun wheel, planet wheels meshing with the respective sun wheels, a planet wheel carrier rotatable about the axis of said shafts, a plurality of gyroscopes carried by said planet wheel carrier with the axes thereof at an angle to the axis of said shafts, said gyroscopes being adapted to rotate in accordance with the motion of said shafts, gearing independent of said planet wheels for rotating said gyroscopes from one of said shafts, and means supporting each gyroscope for rotation about its axis and for limited angular movement about a transverse axis arranged at an angle to the axes of the gyroscope and of said shafts.

3. A planet wheel gearing comprising coaxial driving and driven shafts each carrying a sun wheel, planet wheel means for transmitting motion between said sun wheels and including a planet wheel carrier rotatable about the axis of said shafts, a gyroscope carried by said planet wheel carrier with the axis thereof at an angle to said shafts, said gyroscope being adapted to be rotated in accordance with the motion of said shafts, means actuated by said driving shaft and independent of said planet wheel means for rotating said gyroscope about its axis, means supporting said gyroscope for rotation about its axis, and means supporting said gyroscope for limited angular movement about a transverse axis arranged at an angle to the axes of the gyroscope and of said shafts.

4. A planet wheel gearing comprising coaxial driving and driven shafts each carrying a sun wheel, planet wheels meshing with the respective sun wheels, a planet wheel carrier rotatable about the axis of said shafts, a plurality of gyroscopes carried by said planet wheel carrier with the axes thereof at an angle to the axis of said shafts, said gyroscopes being adapted to rotate in accordance with the motion of said shafts, gearing independent of said planet wheels for rotating said gyroscopes from said driving shaft, and means supporting each gyroscope for rotation about its axis and for limited angular movement about a transverse axis arranged at an angle to the axes of the gyroscope and of said shafts.

5. A planet wheel gearing comprising coaxial driving and driven shafts each carrying a sun wheel, planet wheel means for transmitting motion between said sun wheels and including a planet wheel carrier rotatable about the axis of said shafts, a gyroscope carried by said planet wheel carrier with the axis thereof at an angle to said shafts, said gyroscope being adapted to be rotated in accordance with the motion of said shafts, means actuated by one of said shafts and independent of said planet wheel means for rotating said gyroscope about its axis, means supporting said gyroscope for rotation about its axis, and means supporting said gyroscope for limited angular movement about a transverse axis tangential to the circular path of travel described by the center of gravity of the gyroscope during rotation of the planet wheel carrier.

6. A planet wheel gearing comprising coaxial driving and driven shafts each carrying a sun wheel, planet wheels meshing with the respective sun wheels, a planet wheel carrier rotatable about the axis of said shafts, a plurality of gyroscopes carried by said planet wheel carrier with the axes thereof at an angle to the axis of said shafts, said gyroscopes being adapted to rotate in accordance with the motion of said shafts, gearing independent of said planet wheels for rotating said gyroscopes from one of said shafts, and means supporting each gyroscope for rotation about its axis and for limited angular movement about a transverse axis tangential to the circular path of travel described by the center of gravity of the gyroscope during rotation of the planet wheel carrier.

7. A planet wheel gearing comprising coaxial driving and driven shafts each carrying a sun wheel, planet wheel means for transmitting motion between said sun wheels and including a planet wheel carrier rotatable about the axis of said shafts, a gyroscope carried by said planet wheel carrier with the axis thereof at an angle to said shafts, said gyroscope being adapted to be rotated in accordance with the motion of said shafts, means actuated by one of said shafts and independent of said planet wheel means for rotating said gyroscope about its axis, means supporting said gyroscope for rotation about its axis, means supporting said gyroscope for limited angular movement about a transverse axis arranged at an angle to the axes of the gyroscope and of said shafts, and resilient abutments for limiting the movement of the gyroscope about said transverse axis.

8. A planet wheel gearing comprising coaxial driving and driven shafts each carrying a sun wheel, planet wheels meshing with the respective sun wheels, a planet wheel carrier rotatable about the axis of said shafts, a plurality of gyroscopes carried by said planet wheel carrier with the axes thereof at an angle to the axis of said shafts, said gyroscopes being adapted to rotate in accordance with the motion of said shafts, gearing independent of said planet wheels for rotating said gyroscopes from one of said shafts, means supporting each gyroscope for rotation about its axis and for limited angular movement about a transverse axis arranged at an angle to the axes of the gyroscope and of said shafts, and resilient abutments for limiting the movement of the gyroscope about said transverse axis.

9. A planet wheel gearing comprising two axially alined shafts each carrying a sun wheel, a planet wheel carrier rotatable about the axis of said shafts, planet wheels on said carrier and engaging said sun wheel, a gyroscope and means rotatably supporting the same on said carrier with the axis of the gyroscope at an angle to said shafts, said gyroscope being adapted to be rotated in accordance with the motion of said shafts, means supporting said gyroscope for a limited angular precession about an axis at an angle to the axes of said gyroscope and said shafts, and means independent of said planet wheels for rotating said gyroscope from one of said shafts, said gyroscope comprising a hollow body filled with mercury.

10. A planet wheel gearing comprising two axially alined shafts each carrying a sun wheel, a planet wheel carrier rotatable about the axis of said shafts, planet wheels on said carrier and engaging said sun wheel, a plurality of gyroscopes and means rotatably supporting the same on said carrier with the axes thereof at an angle to said shafts, each gyroscope being adapted to be rotated in accordance with the motion of said shafts, means supporting said gyroscopes for a limited angular precession about an axis at an angle to the axes of said gyroscope and said shafts, and means independent of said planet wheels for rotating said gyroscopes from one of said shafts, each gyroscope comprising a hollow body filled with mercury.

11. A planet wheel gearing comprising coaxial driving and driven shafts each carrying a sun wheel, planet wheel means for transmitting motion between said sun wheels and including a planet wheel carrier rotatable about the axis of said shafts, a gyroscope carried by said planet wheel carrier with the axis thereof at an angle to said shafts, said gyroscope being adapted to be rotated in accordance with the motion of said shafts, means actuated by one of said shafts and independent of said planet wheel means for rotating said gyroscope about its axis, means supporting said gyroscope for rotation about its axis, means supporting said gyroscope for limited angular movement about a transverse axis tangential to the circular path of travel described by the center of gravity of the gyroscope during rotation of the planet wheel carrier, and resilient abutments for limiting the movement of the gyroscope about said transverse axis.

12. A planet wheel gearing comprising coaxial driving and driven shafts each carrying a sun wheel, planet wheels meshing with the respective sun wheels, a planet wheel carrier rotatable about the axis of said shafts, a plurality of gyroscopes carried by said planet wheel carrier with the axes thereof at an angle to the axis of said shafts, said gyroscopes being adapted to rotate in accordance with the motion of said shafts, gearing independent of said planet wheels for rotating said gyroscopes from one of said shafts, means supporting each gyroscope for rotation about its axis and for limited angular movement about a transverse axis tangential to the circular path of travel described by the center of gravity of the gyroscope during rotation of the planet wheel carrier, and resilient abutments for limiting the movement of the gyroscope about said transverse axis.

13. In a planet wheel gearing, the combination with two axially alined shafts, a carrier rotatably mounted on said shafts, planet wheel gearing within said carrier and connecting said shafts, a gyroscope within said carrier and with the axis thereof at an angle to the axis of said shafts, means connected to one of said shafts and independent of said planet wheel gearing for rotating said gyroscope about its axis, and means supporting said gyroscope for a limited precession with respect to said carrier, said gyroscope comprising a hollow body filled with mercury.

14. A planet gearing comprising two axially alined shafts and planetary gearing connecting the same, a casing rotatably supported on said shafts and housing said planetary gearing, a gyroscope within said casing and having its axis at an angle to the axis of said shafts, means independent of said planetary gearing for driving said gyroscope from one of said shafts, and means supporting said gyroscope for a limited angular movement with respect to said casing.

15. In a planet wheel gearing, the combination with two axially alined shafts, a carrier rotatably mounted on said shafts, planet wheel gearing within said carrier and connecting said shafts, a gyroscope within said carrier and with the axis thereof at an angle to the axis of said shafts, means connected to one of said shafts and independent of said planet wheel gearing for rotating said gyroscope about its axis, and means supporting said gyroscope for a limited precession with respect to said carrier; said gyroscope comprising a hollow body having an interior space extending completely around the body, and mercury filling the space within said body.

JOEL NICOLAUS STERN.
HANS BREIEN LARSEN.